United States Patent
Tyler et al.

(10) Patent No.: US 10,290,841 B2
(45) Date of Patent: May 14, 2019

(54) COVER FOR BATTERY CELL

(71) Applicant: Johnson Controls Technology Company, Holland, MI (US)

(72) Inventors: Matthew R. Tyler, Brown Deer, WI (US); Jason D. Fuhr, Sussex, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 1518 days.

(21) Appl. No.: 13/754,410

(22) Filed: Jan. 30, 2013

(65) Prior Publication Data

US 2013/0196201 A1 Aug. 1, 2013

Related U.S. Application Data

(60) Provisional application No. 61/593,247, filed on Jan. 31, 2012.

(51) Int. Cl.
*H01M 2/04* (2006.01)
*H01M 2/12* (2006.01)

(52) U.S. Cl.
CPC ......... *H01M 2/043* (2013.01); *H01M 2/0491* (2013.01); *H01M 2/1241* (2013.01); *H01M 2/0478* (2013.01); *H01M 2200/20* (2013.01); *H01M 2220/20* (2013.01)

(58) Field of Classification Search
None
See application file for complete search history.

(56) References Cited

U.S. PATENT DOCUMENTS 5,795,674 A 8/1998 Shiota
2001/0049056 A1* 12/2001 Saito et al. .................. 429/175
2010/0124674 A1* 5/2010 Kwag .............................. 429/7
2010/0233520 A1* 9/2010 Suzuki et al. .................. 429/56
2011/0311863 A1* 12/2011 Byun ..................... H01M 2/06
429/181
2012/0156532 A1* 6/2012 Han ..................... H01M 2/0217
429/53

FOREIGN PATENT DOCUMENTS

CN 1929185 A * 3/2007
CN 201084758 Y 7/2008
JP 2002008616 A * 1/2002

OTHER PUBLICATIONS

EP 13703979.8 Office Action dated Apr. 19, 2017.
International Search Report for PCT Application No. PCT/US2013/023978 dated Jun. 21, 2013, 5 pgs.

* cited by examiner

*Primary Examiner* — Sarah A. Slifka
*Assistant Examiner* — Haroon S. Sheikh
(74) *Attorney, Agent, or Firm* — Fletcher Yoder, P.C.

(57) ABSTRACT

A battery includes a cell element that is disposed in a housing, and the housing is sealed with a top cover made primarily of plastic. The top cover may include a layer of metallic foil, which may make the top cover more impermeable to moisture. The top cover may also include a vent, which may or may not utilize the metallic foil to determine the primary opening force of the vent. The top cover may also have one or more stiffening ribs that extend downwardly from a bottom portion of the top cover to contact the cell element, so as to limit movement of the cell element within the housing. In addition, the top cover may have one or more conductive terminals that are at least partially overmolded by the plastic of the top cover.

17 Claims, 5 Drawing Sheets

COVER FOR BATTERY CELL

CROSS REFERENCE TO RELATED APPLICATIONS

This application is a Non-Provisional Application of U.S. Provisional Patent Application No. 61/593,247, entitled "Plastic Cover for Lithium-ion Cells," filed Jan. 31, 2012, which is herein incorporated by reference in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates generally to the field of batteries and battery systems. More specifically, the present disclosure relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles" (xEVs)) may provide a number of advantages as compared to more traditional gas-powered vehicles using internal combustion engines. For example, electric vehicles may produce fewer undesirable emission products and may exhibit greater fuel efficiency as compared to vehicles using internal combustion engines. In some cases, such vehicles may eliminate the use of gasoline entirely, as is the case of certain types of EVs.

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with manufacturing and/or using the battery systems.

SUMMARY

Certain aspects commensurate in scope with certain embodiments disclosed herein are set forth below. It should be understood that these aspects are presented merely to provide the reader with a brief summary of certain embodiments and that these aspects are not intended to limit the scope of the disclosure or claims. Indeed, the disclosure and claims may encompass a variety of aspects that may not be set forth below.

A battery includes a top cover to enclose a cell element and other internals within a housing. In certain embodiments, the top cover may include a molded plastic material that hermetically seals the battery internals. Plastic is relatively light and may have a lower manufacturing cost and improved mechanical properties compared to certain other materials. The positive and/or negative terminals of the battery may be overmolded by the top cover to further simplify manufacturing and reduce cost. Furthermore, a metal foil may be disposed within the plastic cover to reduce the overall water permeability of the battery and/or to provide for efficient venting of the battery.

With regard to venting, the cell element of the battery may produce gases that build up within the housing, and these gases can increase the internal pressure of the battery. Accordingly, it may be desirable to vent these gases to decrease the internal pressure of the battery. To this end, the top cover may include a vent that is designed to create an opening in the top cover, thereby enabling the gases to escape. In particular, the vent may be designed to deploy from a central point or axis of the vent. In other words, the peripheral portion of the vent may remain fixed (e.g., hinged) to the top cover, whereas an inner portion of the vent extends in a direction transverse to the top cover. In addition, the vent may be thinner than the remainder of the top cover to facilitate deployment of the vent while retaining the structural integrity of the top cover.

Furthermore, the battery may include one or more stiffening ribs internally coupled to the top cover. In certain embodiments, the top cover of the battery may be substantially flat, whereas the cell element within the housing has a prismatic shape with a rounded or arcuate edge. Due to their respective geometries, a gap may be produced between the top cover and the cell element. In embodiments where the stiffening ribs are employed, the stiffening ribs serve to occupy the gap between the top cover and the cell element, thereby forming an abutment surface between the top cover and the cell element. The abutment surface helps to support the cell element within the housing and to reduce movement of the cell element within the housing.

DRAWINGS

The disclosure will become more fully understood from the following detailed description, taken in conjunction with the accompanying figures, wherein like reference numerals refer to like elements, in which.

DETAILED DESCRIPTION

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

For the purposes of the present disclosure, it should be noted that the presently disclosed embodiments are particularly directed toward applications for electric vehicles. In particular, the term "xEV" may be used herein to describe any vehicle that derives at least a portion of its motive power from an electric power source (e.g. a battery system). As will be appreciated by those skilled in the art, hybrid electric vehicles (HEVs) combine an internal combustion engine propulsion and high voltage battery power to create traction. The term HEV may include any variation of a hybrid electric vehicle, such as micro-hybrid and mild hybrid systems, which disable the internal combustion engine when the vehicle is idling and utilize a battery system to continue powering the air conditioning unit, radio, or other electronics, as well as to kick-start the engine when propulsion is desired. The mild hybrid system may apply some level of power assist to the internal combustion engine, whereas the micro-hybrid system may not supply power assist to the internal combustion engine. A plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid vehicles (PHEVs), and electric vehicle conversions of hybrid electric vehicles and conventional internal combustion engine vehicles. An electric vehicle (EV) is an all-electric vehicle that uses for its propulsion one or more motors powered by electric energy. The term "xEV" is defined herein to include all of the foregoing or any variations or combinations thereof that include electric power as a motive force.

In accordance with presently disclosed embodiments, provided herein are batteries with improved mechanical properties and reduced manufacturing costs. In particular, a top cover of the battery may include a molded plastic. A vent may be disposed on the top cover has a lesser thickness than the remainder of the top cover, thereby facilitating deployment of the vent to allow effluent gases to escape from the battery while retaining the structural integrity of the top cover. In addition, the top cover may include an internal metal foil to reduce the water permeability of the battery and/or to work in conjunction with the vent to facilitate venting of battery gases. Furthermore, the top cover may also include one or more stiffening ribs that extend into the housing to reduce the movement of a cell element within the battery. It should be noted that the plastic top cover, the vent, the internal metal foil, and the stiffening ribs may be used separately or in some combination with one another.

Figure 1:
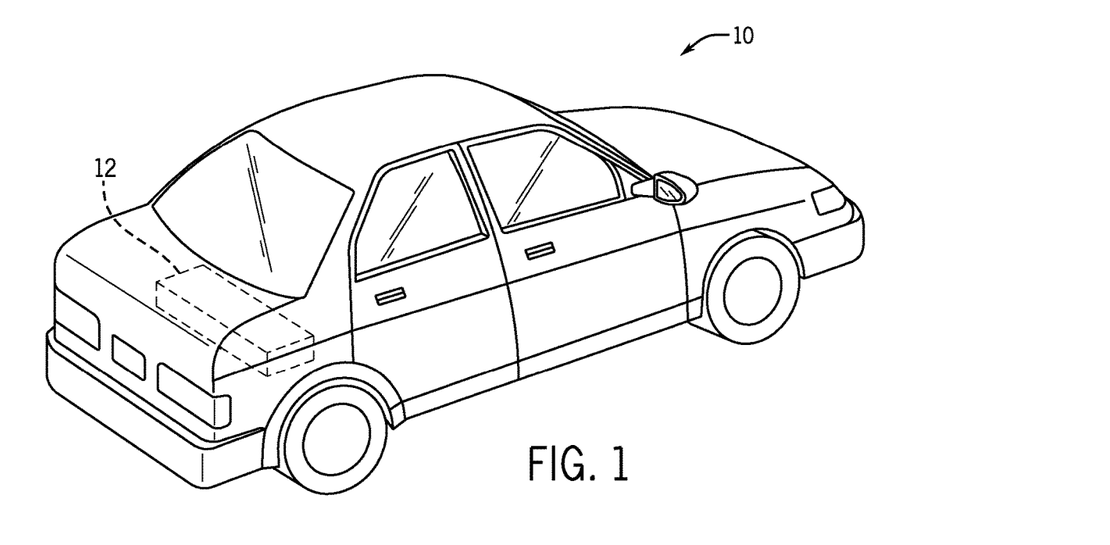
FIG. 1 is a perspective view of an embodiment of a vehicle having a battery system to provide power for various components of the vehicle.

Turning now to the figures, FIG. 1 is a perspective view of an embodiment of a vehicle 10 (e.g., an xEV) in the form of an automobile (e.g., a car) having a battery system 12 for providing power to various components of the vehicle 10. For example, the battery system 12 may provide all or a portion of the motive power for the vehicle 10. Such a vehicle 10 may be an electric vehicle (EV), a hybrid electric vehicle (HEV), a plug-in hybrid electric vehicle (PHEV), or another type of vehicle using electric power for some or all of its motive power.

Although the vehicle 10 is illustrated as a car in FIG. 1, the type of vehicle may differ according to other embodiments, all of which are intended to fall within the scope of the present disclosure. For example, the vehicle 10 may be a truck, bus, industrial vehicle, motorcycle, recreational vehicle, boat, locomotive, airplane or any other type of vehicle that may benefit from the use of electric power generated by a battery system. However, it should be appreciated that the techniques described herein could also be used in battery systems in a wide variety of non-vehicular applications as well, such as generator sets, turbines, wind farms, etc.

To use electrical power to propel the vehicle 10, the vehicle 10 may include various internal components, such as a motor, a transmission system, and the like. The various internal components of the vehicle 10 are illustrated in greater detail with respect to FIG. 2, which illustrates a cutaway schematic view of the vehicle 10. The battery system 12 is provided toward the rear of the vehicle 10 proximate a fuel tank 14. It should be noted that the battery system 12 may be located in various areas within the vehicle 10, such as immediately adjacent the fuel tank 14 or in a separate compartment of the vehicle 10. The battery system 12 is used to provide power to an electric motor 16, which, in turn, may provide all or a portion of the motive power for the vehicle 10. An internal combustion engine 18 may also be used to provide a portion of the motive power for the vehicle 10.

Figure 2:
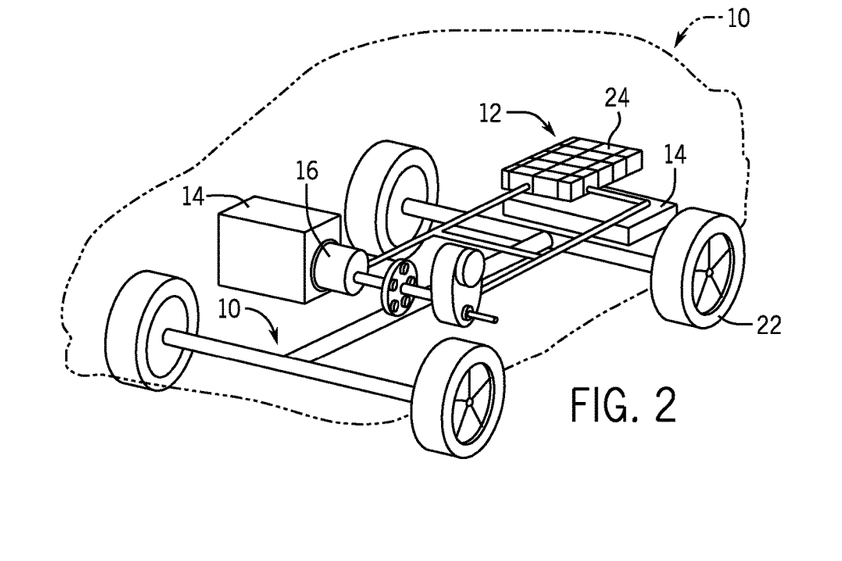
FIG. 2 is a cutaway schematic view of an embodiment of the vehicle and the battery system of FIG. 1.

As shown, the electric motor 16 and the engine 18 are coupled to a transmission system 20 to provide motive power for the vehicle. The transmission system 20 provides a controlled application of power from the electric motor 16 and the engine 18 to a plurality of wheels 22. As noted earlier, the type of the vehicle 10 may differ, and the number of wheels may also differ accordingly. For example, the vehicle 10 may have 2 wheels (e.g., a motorcycle), 3 wheels (e.g., an all-terrain vehicle), 4 wheels (e.g., a car), or 5 or more wheels (e.g., a truck, bus, and the like). The electric motor 16 is powered by a plurality of electrochemical cells or batteries 24 within the battery system 12. That is, the batteries 24 supply electrical energy to the electric motor 16, which converts the electrical energy into mechanical energy to rotate the wheels 22.

Figure 3:
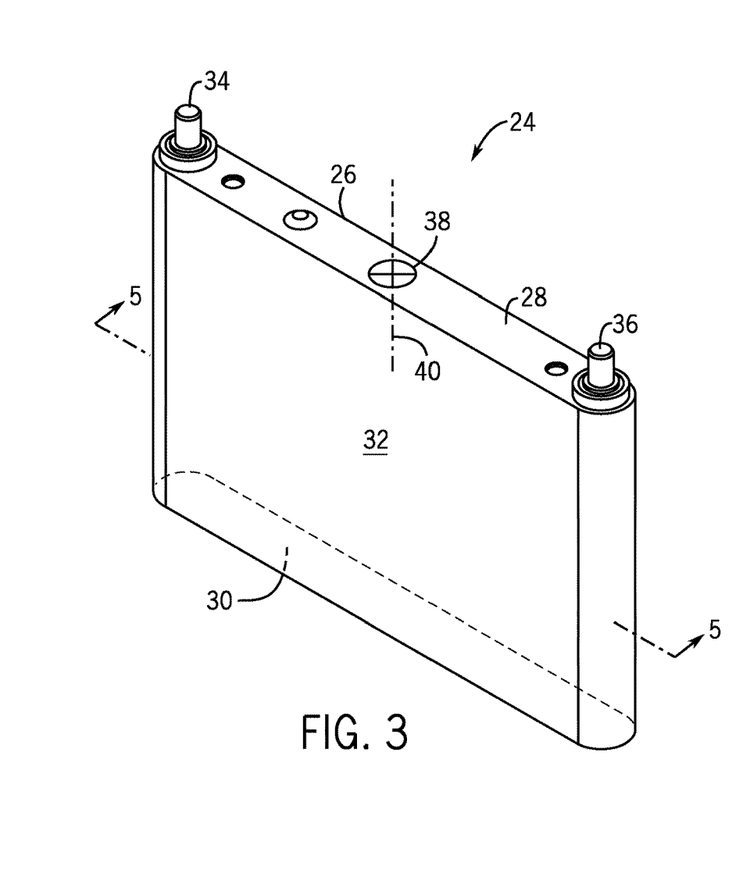
FIG. 3 is a perspective view of an embodiment of a battery that may be used within the battery system of FIG. 1.

To illustrate the external structure of the battery 24, FIG. 3 is a perspective view of an embodiment of the battery 24 used to supply power to the electric motor 16. As shown in FIG. 3, the battery 24 includes a housing 26 having a generally flat top cover 28, a bottom portion 30, and a side portion 32 extending therebetween. The shape of the housing 26 enables multiple batteries 24 to be placed adjacent to one another with minimal void space, such as in a battery pack of the battery system 12. However, the shape of the housing 26 may vary according to implementation-specific designs, and may be, for example, cylindrical, prismatic, polyhedral, or any other suitable shape.

The top cover 28 includes a positive terminal 34 and a negative terminal 36 that enable the transfer of energy from the battery 24 to a load. The positive terminal 34 and negative terminal 36 may be made of conductive material, such as steel, aluminum or copper. Moreover, since the top cover 28 of the battery 24 is made of a plastic or polymer material in this embodiment, the positive terminal 34 and negative terminal 36 may be overcoated with such material. In other words, during manufacture of the plastic top cover 28, the conductive materials used to form the positive terminal 34 and the negative terminal 36 may be placed in the mold so that the plastic is formed around the conductive materials, as will be described in greater detail with respect to FIG. 5. Such a process fixes the positive terminal 34 and negative terminal 36 in place, thus reducing manufacturing time, steps and cost.

The top cover 28 includes a vent 38 that is designed to open along a center or axis 40 in response to a pressure buildup within the battery 24. That is, gases may accumulate within the housing 26 as a result of chemical reactions occurring within the battery 24. Buildup of these gases may increase the pressure within the housing 26, thereby reducing the operability of the battery 24. If the pressure becomes great enough, it may be is desirable to release the gases through the vent 38 to relieve the pressure within the battery housing 26. The vent 38 will be described in more detail below with respect to FIGS. 6-9.

Figure 4:
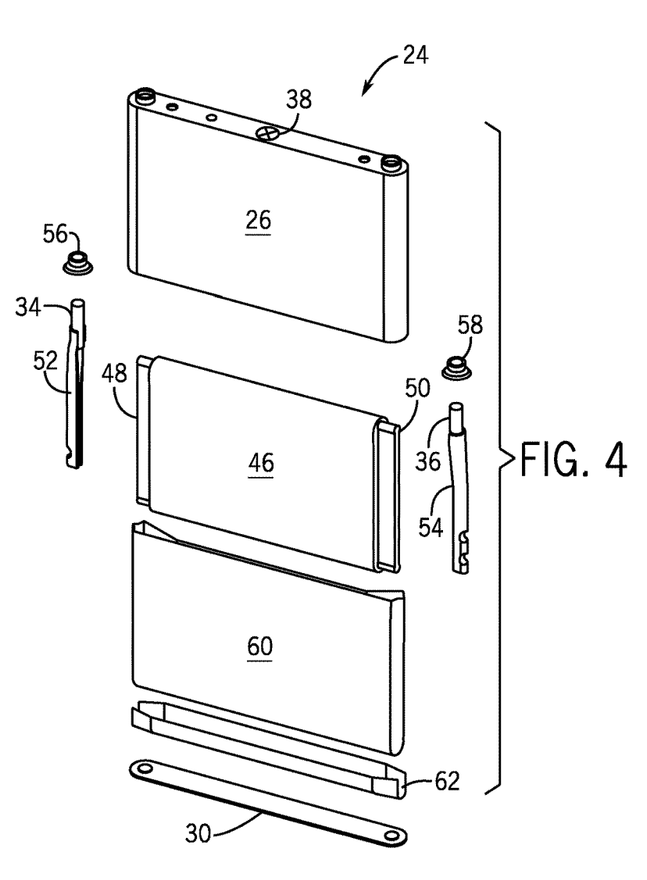
FIG. 4 is an exploded view of an embodiment of the battery of FIG. 3.

To illustrate the internal components of the battery 24, FIG. 4 is an exploded view of an embodiment of the battery 24 of FIG. 3. A cell element 46 is disposed within the housing. The cell element 46 includes a positive electrode 48 and a negative electrode 50 (e.g., a cathode and an anode), as well as an electrolyte (e.g., lithium, nickel-metal-hydride, lead, and the like) that stores chemical potential energy that may be later be converted into electrical energy for the electric motor 16 of FIG. 2. The positive electrode 48 is coupled to the positive terminal 34 of the battery 24 via a positive current collector 52, and the negative electrode 50 is coupled to the negative terminal 36 of the battery 24 through a negative current collector 54. Thus, when an electrical connection is made between the positive and negative terminals 34 and 36 of the battery 24, a complete electrical circuit is formed between the positive and negative electrodes 48 and 50, thereby allowing current to flow from the battery 24.

In embodiments where the positive and negative terminals 34 and 36 are not overmolded with the plastic top cover 28, the battery 24 may also include insulators 56 and 58 that electrically insulate the current collectors 52 and 54 and the terminals 34 and 36 from the housing 26. In a similar manner, electrically insulating films 60 and 62 (e.g., polymer, polyimide, etc.) may surround the cell element 46 when the battery 24 is assembled, thereby insulating the cell element 46 from the housing 26. Accordingly, the insulators 56, 58, 60, and 62 may reduce the possibility of charge or electrical current flowing through the housing 26, which is typically made of a conductive material, such as metal. However, in certain embodiments, the insulating films 60 and/or 62 may not be used. For example, if all or a portion of the housing 26 is constructed from non-conductive materials, e.g., non-metallic materials such as plastic, to decrease the weight and manufacturing cost of the battery, then the housing 26 itself may provide adequate electrical insulation. Alternatively, if the housing 26 is made of a conductive material, such as metal, the insulating films 60 and/or 62, as well as one of the insulators 56 or 58, may not be used if it is desired that the housing 26 be negatively or positively charged.

Figure 5:
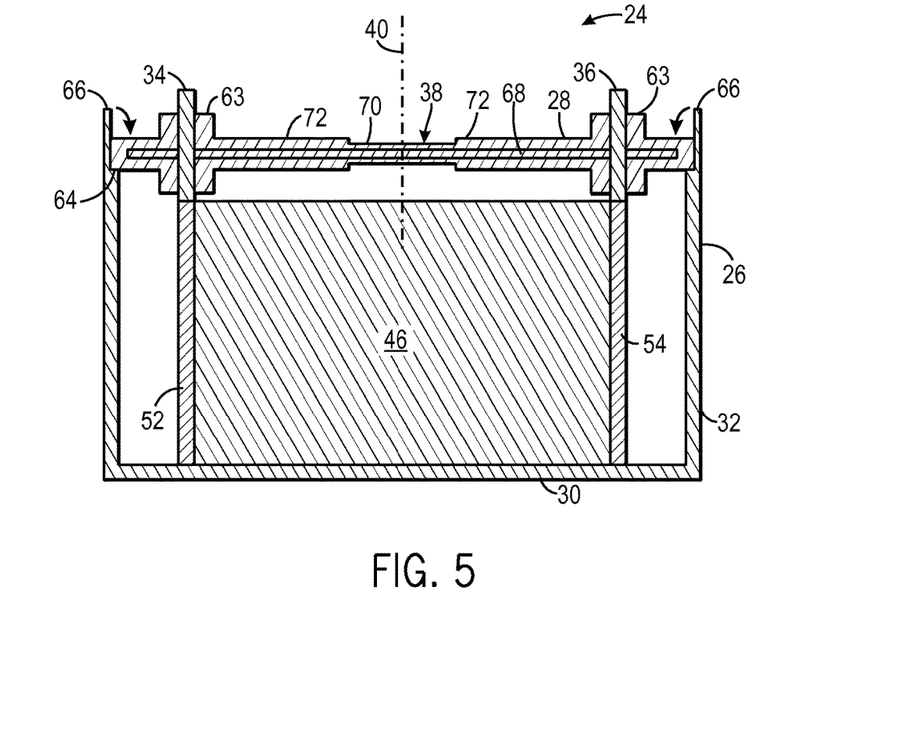
FIG. 5 is a cross-sectional view of an embodiment of the battery of FIG. 3, taken along lines 5-5, illustrating overmolded terminals and different thicknesses of a vent and a remaining portion of a top cover of the battery.

However, in embodiments where the positive and negative terminals 34 and 36 are overmolded with the plastic top cover 28, the battery 24 may generally be depicted as illustrated in FIG. 5, which is cross-sectional view of the battery 24 taken along lines 5-5 of FIG. 3. In certain embodiments, the plastic top cover 28 may be formed by, for example, over-molding or insert-molding plastic over the terminals 34 and 36. In other words, portions 63 of the top cover 28 may be molded around the terminals 34 and 36 so that they may extend through the plastic top cover 28. As depicted, a portion of the terminals 34 and 36 may extend above the portions 63 of the top cover 28 so that the terminals 34 and 36 can be easily coupled to a load, and a lower portion of the terminals 34 and 36 are disposed inside the housing 26 and respectively coupled to the negative and positive current collectors 52 and 54. Overmolding the terminals 34 and 36 with the plastic top cover 28 not only simplifies manufacturing and reduces costs, but it also provides a hermetic seal around the terminals 34 and 36 to facilitate operability of the battery 24.

There are a variety of ways that the top cover 28 may be coupled to the housing 26 of the battery 24. In the depicted example, the housing 26 may be made of metal, the plastic top cover 28 may be supported by a ledge 64 and substantially surrounded by extensions 66. The extensions 66 of the housing 26 may be folded over the plastic top cover 28 to secure the plastic top cover 28 in place. In embodiments, where the housing 26 is made of another material, such as plastic, the extensions 66 may also be made of plastic and molded over the top cover 28. Of course, it should be appreciated that the top cover 28 may be coupled to the housing 26 in any suitable manner, such as by using bolts, welding, adhesive, etc.

In the depicted embodiment, the plastic top cover 28 includes a thin metallic foil 68, which may decreases the water permeability of the top cover 28. As will be appreciated, the introduction of water into the housing 26 may reduce the efficiency of the battery 24 by interfering with chemical reactions within the cell element 46. Plastics are generally more water-permeable than metals. However, the inclusion of the metal foil 68 enables the top cover 28 to be formed from plastic while still retaining the lower water permeability of metals.

The shape of the metallic foil 68 may be based on the location of the terminals 34 and 36. For example, if the metallic foil 68 is in electrical contact with both of the terminals 34 and 36, an undesirable short circuit could be formed through the metallic foil 68 and the cell element 46. Accordingly, the metallic foil 68 may be designed to be in electrical contact with at most one (i.e., zero or one) of the terminals 34 and 36. In some configurations, the design of certain systems (e.g., a current-interrupt system) may be based on having an electrically-charged housing 26. The electrically-charged housing 26 may be enabled by having the metallic foil 68 in contact with one of the terminals 34 or 36. Alternatively, a neutral-charged housing 26 may be obtained by ensuring that the metallic foil 68 does not contact either of the terminals 34 or 36.

As explained earlier, the battery 24 includes the vent 38 that may be used to relieve effluent gases within the housing 26, thereby decreasing the internal pressure of the battery 24. In certain embodiments, the vent 38 may be integrally formed in the top cover 28. For example, grooves and/or other features of the vent 38 may be molded, stamped, scribed or otherwise formed into the top cover 28. These grooves or other features are designed to provide an area of the top cover 28 for the vent 38 that is weaker than the remainder of the top cover 28, so that the vent 38 will open once the build up of gases within the housing 26 reaches a certain point. Furthermore, as explained in greater detail with respect to FIGS. 6-9, these grooves or other features may be designed to cause the vent 38 to open in a certain manner.

To maintain the structural integrity of the top cover 28 while providing the vent 38, the top cover 28 may have a variable thickness across its length. More specifically, the plastic in the area 70 of the vent 38 is thinner than the plastic in the remaining area 72 of the top cover 28. The thinner plastic 70 enables the vent 38 to open with less resistance, while the thicker plastic 72 maintains the structural integrity of the top cover 28.

The thickness of the plastic in the area 70 of the vent 38 may be designed based on a desired operating force needed to deploy the vent 38. For example, the plastic in the area 70 may be made thicker if a greater operating force is desired or thinner if a lesser operating force is desired. Furthermore, the thickness of the plastic in the area 70 may depend on various other factors, such as the chemistry of the cell element 46 or the application of the battery system 12. The desired operating force may also affect other factors in designing the vent 38, such as the size, shape, and geometry of the vent 38, as discussed below with respect to FIGS. 6-9.

Generally speaking, however, the thickness of the plastic in the area 70 of the vent 38 may not contribute significantly in the determination of how much force is required to open the vent 38 in embodiments in which the top cover 28 includes the metallic foil 68. Indeed, the thickness and/or composition of the metallic foil 68 may be selected such that the metallic foil 68 provides the primary barrier between the internals of the battery 24 and the environment outside of the battery 24. In such embodiments, the plastic in the area 70 of the vent 38 may provide little additional resistance to forces that may build up inside of the battery 24. However, even if the plastic in the area 70 provides little resistance with regard to the force required to open the vent 38, the design of the grooves and/or other features of the plastic in the area 70 may provide some control as to the manner in which the vent 38 opens or deploys. Furthermore, the plastic in the area 70 provides protection for the metallic foil 68 to prevent corrosion or mechanical damage, e.g., scratches.

Figure 6:
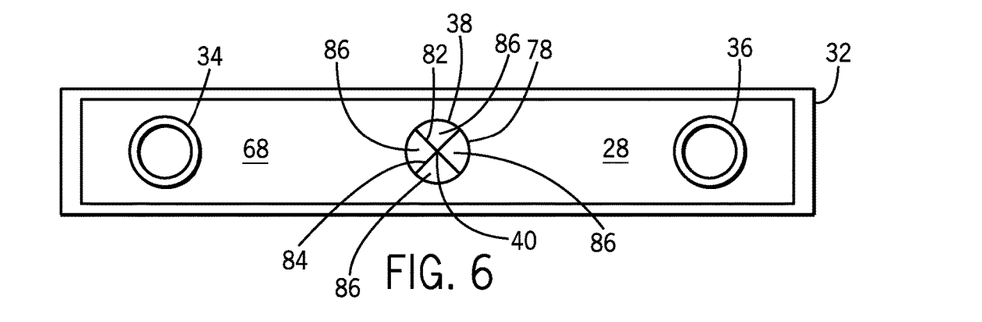
FIG. 6 is a top view of an embodiment of the battery of FIG. 3, illustrating features of the vent.

In one example, the vent 38 may be circular, as illustrated in FIG. 6. In this embodiment, a circular groove 78 defines an outer periphery of the vent 38, and crosswise grooves 82 and 84 extend from the circular groove 78 through the center or axis 40 of the vent 38 to create four flaps or subsections 86. When the vent 38 deploys, the vent 38 separates along the grooves 82 and 84 such that the subsections 86 open away from the center or axis 40 of the vent 38. When the subsections 86 are extended, the circular groove 78 tends to act as a hinge so that outer periphery of the vent 38 remains fixed to the top cover 28. Hence, the grooves 78, 82 and 84 facilitate a relatively controlled and predictable manner in which the vent 38 opens.

Figure 8:
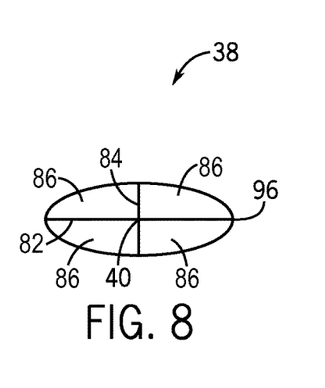
FIG. 8 is a schematic view of an embodiment of the vent of FIG. 6, illustrating an arcuate shape.
Figure 9:
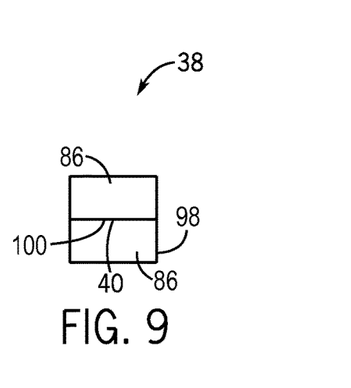
FIG. 9 is a schematic view of an embodiment of the vent of FIG. 6, illustrating a square shape.

In certain embodiments, the number, size, and/or shape of the vents 38 may vary. For example, the top cover 28 may include a single vent 38 or multiple vents 38, and the vents 38 may be square, circular, polygonal, arcuate, or another suitable shape. Furthermore, the size, location, and number of the grooves may vary. Examples of alternative designs are illustrated in FIGS. 7-9, but it should be noted that these embodiments are given by way of example, and are not intended to be limiting.

Figure 7:
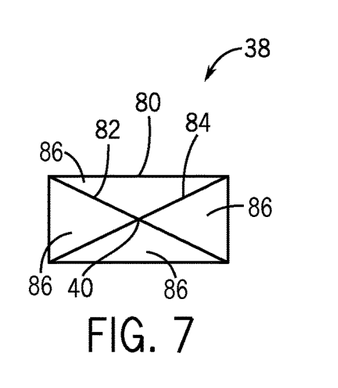
FIG. 7 is a schematic view of an embodiment of the vent of FIG. 6, illustrating a rectangular shape.

In one alternative embodiment, FIG. 7 illustrates that the vent 38 has its outer periphery defined by a rectangular groove 80 with crosswise grooves 80 and 82 defining the flaps or subsections 86. Like the circular design described above, when the vent 38 deploys, the vent 38 separates along the grooves 82 and 84 such that the subsections 86 open away from the center or axis 40 of the vent 38. When the subsections 86 are extended, the rectangular groove 88 tends to act as a hinge so that outer periphery of the vent 38 remains fixed to the top cover 28. In another alternative embodiment, FIG. 8 illustrates that the vent 38 has its outer periphery defined by an elliptical groove 96 with the crosswise grooves 82 and 84 defining the flaps or subsections 86. When the vent 38 deploys, the vent 38 separates along the grooves 82 and 84 such that the subsections 86 open away from the center or axis 40 of the vent 38. When the subsections 86 are extended, the elliptical groove 96 tends to act as a hinge so that outer periphery of the vent 38 remains fixed to the top cover 28. However, if the grooves 82 and 84 do not extend to an outer edge 96 of the vent 38, the subsections 86 may be more resistant to separation and may not separate entirely during deployment of the vent 38. Furthermore, the operating force needed to deploy the vent 38 may increase. Lastly, FIG. 9 illustrates a vent 38 having its outer periphery defined by a square groove 98 with a single groove 100 extending through the center 40 of the vent 38 to define two flaps or subsections 86. When the vent 38 deploys, the vent 38 separates along the groove 100 such that the subsections 86 open away from the center or axis 40 of the vent 38. When the subsections 86 are extended, at least some portion of the square groove 98 tends to act as a hinge so that outer periphery of the vent 38 remains fixed to the top cover 28.

Figure 10:
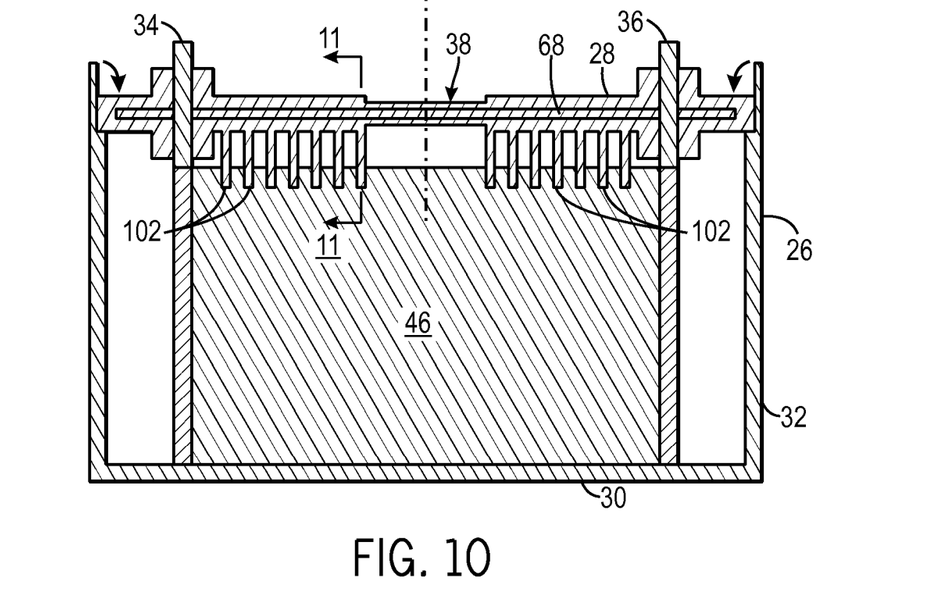
FIG. 10 is a side view of an embodiment of the battery of FIG. 3, taken along lines 5-5, illustrating one or more stiffening ribs that may abut against a cell element.
Figure 11:
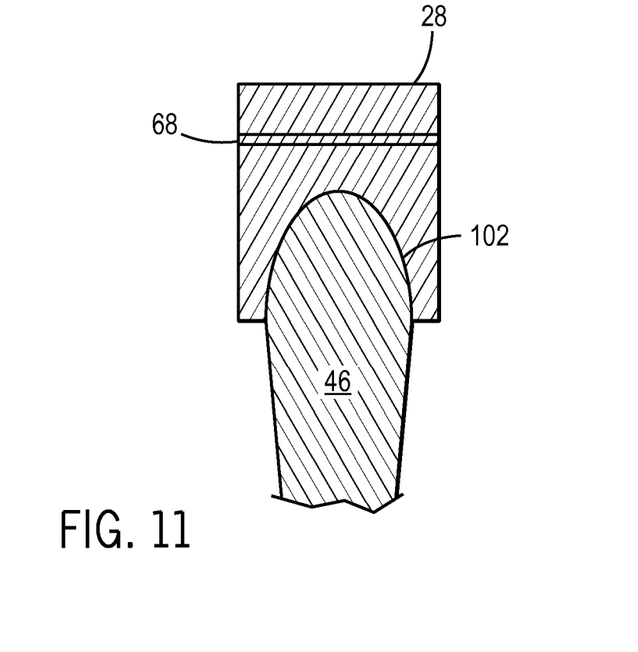
FIG. 11 is a side view of an embodiment of the stiffening rib, taken along lines 11-11 of FIG. 10, illustrating an arcuate shape that may abut against the cell element.

The top cover 28 may also include other features to improve the operability and life of the battery 24. For example, as illustrated in FIG. 10, the bottom portion of the top cover 28 may include a structure designed to hold the top portion of the cell element 46 in place to reduce or eliminate axial movement of the cell element 46 within the housing 26. In the illustrated embodiment, this structure may take the form of one or more stiffening ribs 102 coupled to the bottom of the top cover 28. The stiffening ribs 102 extend downwardly within the housing 26 to contact the top of the cell element 46. Because the top of the cell element 46 has a generally arcuate shape due to the winding or folding of the plates used to form the cell element 46, the portion of the stiffening ribs 102 that contact the top of the cell element 46 may have a complimentary arcuate shape, as shown in FIG. 11. In particular, the length, shape and number of the stiffening ribs 102 are selected to substantially eliminate any gap between the top cover 28 and the cell element 46 so that movement of the cell element 46 within the housing 26 is reduced or eliminated.

The stiffening ribs 102 may be formed of plastic, and in certain embodiments, may be integrally formed with the plastic top cover 28. In addition, the stiffening ribs 102 may be disposed in a variety of locations along the plastic top cover 28. For example, as shown in FIG. 10, the stiffening ribs 100 are not disposed directly underneath the vent 38 to facilitate deployment of the vent 38. However, in certain embodiments, the stiffening ribs 102 may be employed continuously across the length of the top cover 28. Furthermore, the number of stiffening ribs 102 may vary. For example, the top cover 28 may include a plurality of equally-spaced stiffening ribs 102, as shown. Alternatively, the top cover 28 may include a single stiffening rib or surface extending across the length of the top cover 28. The number and size of stiffening ribs 102 may be influenced by several factors, such as a desired weight of the battery, manufacturing cost, and other mechanical properties.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

What is claimed is:

1. A battery, comprising:
a housing having a top portion;
a lithium-ion cell element disposed within the housing; and
a top cover disposed on the top portion of the housing, the top cover comprising a metallic foil, a first layer of plastic disposed on a first side of the metallic foil, and a second layer of plastic disposed on a second side of the metallic foil opposite to the first side;
wherein the top cover comprises a vent disposed in a vent area of the top cover, wherein the vent is configured to open in response to pressure within the housing exceeding a threshold, wherein the metallic foil extends through an entirety of the vent area of the top cover, and wherein the first layer of plastic, the second layer of plastic, or both the first and second layers of plastic in the vent area of the top cover include a first thickness that is less than a second thickness of the first layer of plastic, the second layer of plastic, or both the first and second layers of plastic, respectively, in a remaining area of the top cover outside of the vent area.

2. The battery of claim 1, comprising first and second terminals extending through the top cover, wherein the metallic foil is coupled to at most one of the first and second terminals.

3. The battery of claim 1, wherein the vent comprises:
a periphery defined by a first groove formed in the first layer of plastic, the second layer of plastic, the metallic foil, or a combination thereof; and
a plurality of flaps defined by at least one second groove formed in the first layer of plastic, the second layer of plastic, the metallic foil, or a combination thereof.

4. The battery of claim 3, wherein the vent is configured to open by breaking generally along the at least one second groove such that the flaps remain generally attached to the top cover by bending generally along the first groove.

5. The battery of claim 3, wherein the periphery of the vent comprises the first groove having one of a generally circular shape, a generally elliptical shape, or a generally rectangular shape.

6. The battery of claim 1, wherein the top cover comprises at least one stiffening rib having a contour configured to abut the lithium-ion cell element.

7. The battery of claim 1, wherein the metallic foil is overmolded by plastic of the top cover and the plastic of the top cover includes the first and second layers of plastic.

8. A battery, comprising:
a housing having a top portion;
a lithium-ion cell element disposed within the housing; and
a top cover disposed on the top portion of the housing, wherein the top cover comprises a metallic foil extending along a length of the top cover, a first layer of plastic disposed on a first side of the metallic foil, a second layer of plastic disposed on a second side of the metallic foil opposite to the first side, a vent configured to open in response to pressure within the housing exceeding a venting threshold, and at least one conductive terminal that is at least partially overmolded by the first layer of plastic, the second layer of plastic, or both the first and second layers of plastic;
wherein the vent is disposed in a vent area of the top cover, wherein the metallic foil extends through an entirety of the vent area of the top cover, and wherein the first layer of plastic, the second layer of plastic, or both the first and second layers of plastic in the vent area of the top cover include a first thickness that is less than a second thickness of the first layer of plastic, the second layer of plastic, or both the first and second layers of plastic, respectively, in a remaining area of the top cover outside of the vent area.

9. The battery of claim 8, wherein the top cover comprises two conductive terminals, wherein both of the two conductive terminals are at least partially overmolded by the first layer of plastic, the second layer of plastic, or both the first and second layers of plastic, and wherein both of the two conducive terminals extend through the top cover.

10. The battery of claim 8, wherein the vent comprises a periphery defined by a first groove formed in the first layer of plastic, the second layer of plastic, the metallic foil, or a combination thereof, wherein the vent comprises a plurality of flaps defined by at least one second groove formed in the first layer of plastic, the second layer of plastic, the metallic foil, or a combination thereof, and wherein the vent is configured to open by breaking generally along the at least one second groove such that the flaps remain generally attached to the top cover by bending generally along the first groove.

11. The battery of claim 8, wherein the top cover comprises at least one stiffening rib having a contour configured to abut the lithium-ion cell element.

12. The battery of claim 8, wherein the metallic foil is overmolded by plastic of the top cover and the plastic of the top cover includes the first and second layers of plastic.

13. A battery, comprising:
a housing having a top portion;
a lithium-ion cell element disposed within the housing; and
a top cover disposed on the top portion of the housing, the top cover having a metallic foil extending along a length of the top cover, a first layer of plastic disposed on a first side of the metallic foil, a second layer of plastic disposed on a second side of the metallic foil opposite to the first side, a vent configured to open in response to pressure within the housing exceeding a venting threshold, and at least one stiffening rib disposed on the second layer of plastic of the top cover and extending downwardly from the second layer of plastic to contact the lithium-ion cell element;
wherein the vent is disposed in a vent area of the top cover, wherein the metallic foil extends through an entirety of the vent area of the top cover, and wherein the first layer of plastic, the second layer of plastic, or both the first and second layers of plastic in the vent area of the top cover include a first thickness that is less than a second thickness of the first layer of plastic, the second layer of plastic, or both the first and second layers of plastic, respectively, in a remaining area of the top cover outside of the vent area.

14. The battery of claim 13, wherein the at least one stiffening rib comprises a U-shaped portion configured to contact the lithium-ion cell element.

15. The battery of claim 13, comprising a plurality of stiffening ribs disposed on the second layer of plastic of the top cover and extending downwardly from the second layer of plastic to contact the lithium-ion cell element.

16. The battery of claim 13, wherein the at least one stiffening rib is aligned with the remaining area of the top cover.

17. The battery of claim 13, wherein the metallic foil is overmolded by plastic of the top cover and the plastic of the top cover includes the first and second layers of plastic.

* * * * *

UNITED STATES PATENT AND TRADEMARK OFFICE
CERTIFICATE OF CORRECTION

| | | |
|---|---|---|
| PATENT NO. | : 10,290,841 B2 | Page 1 of 1 |
| APPLICATION NO. | : 13/754410 | |
| DATED | : May 14, 2019 | |
| INVENTOR(S) | : Matthew R. Tyler et al. | |

It is certified that error appears in the above-identified patent and that said Letters Patent is hereby corrected as shown below:

On the Title Page

In Item (73), under "Assignee", please delete "Johnson Controls Technology Company, Auburn Hills, MI (US)", and insert -- CPS Technology Holdings LLC, New York, NY (US) --.

In the Specification

In Column 2, Line 32, please delete "DRAWINGS" and insert -- BRIEF DESCRIPTION OF THE DRAWINGS --.

In Column 6, Line 29, please delete "may decreases" and insert -- may decrease --.

In Column 8, Lines 50-51, please delete "stiffening ribs 100" and insert -- stiffening ribs 102 --.

In the Claims

In Column 10, Line 17, in Claim 9, please delete "conducive" and insert -- conductive --.

Signed and Sealed this
Twenty-sixth Day of November, 2019

Andrei Iancu
*Director of the United States Patent and Trademark Office*